US006942286B2

(12) United States Patent
Böhm et al.

(10) Patent No.: US 6,942,286 B2
(45) Date of Patent: Sep. 13, 2005

(54) RETRACTABLE ROOF FOR VEHICLES

(75) Inventors: Horst Böhm, Frankfurt (DE); Rainer Grimm, Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 87 days.

(21) Appl. No.: 10/684,103

(22) Filed: Oct. 10, 2003

(65) Prior Publication Data

US 2004/0130189 A1 Jul. 8, 2004

Related U.S. Application Data

(63) Continuation-in-part of application No. 09/982,248, filed on Oct. 17, 2001, now abandoned, which is a continuation of application No. 09/581,975, filed as application No. PCT/EP99/08843 on Nov. 17, 1999, now abandoned.

(30) Foreign Application Priority Data

Nov. 18, 1998 (DE) .................................... 298 20 613 U

(51) Int. Cl.[7] ................................................ B60J 7/047

(52) U.S. Cl. ........................... 296/216.05; 296/216.09; 296/220.01

(58) Field of Search ....................... 296/216.05, 216.09, 296/220.01

(56) References Cited

U.S. PATENT DOCUMENTS 1,272,983 A 7/1918 Menzo
1,387,062 A 8/1921 Marshall
1,787,451 A 1/1931 Mohun et al.
2,338,309 A 1/1944 Votypka (Continued)

FOREIGN PATENT DOCUMENTS

| | | |
|---|---|---|
| AU | 208672 | 1/1957 |
| CH | 571641 | 11/1975 |
| DE | 571 641 | 4/1933 |
| DE | 819 639 | 11/1951 |
| DE | 30 20 675 | 12/1981 |
| DE | 31 16 641 | 11/1982 |
| DE | 32 23 136 | 3/1983 |
| DE | 33 11 428 | 10/1983 |
| DE | 33 11 452 | 10/1983 |
| DE | 33 16 739 | 1/1984 |
| DE | 33 45 122 | 7/1984 |
| DE | 34 16 176 | 11/1984 |
| DE | 34 42 615 | 5/1986 |

(Continued)

OTHER PUBLICATIONS

International Search Report, dated Mar. 10, 2000.

*Primary Examiner*—Dennis H. Pedder
(74) *Attorney, Agent, or Firm*—Fay, Sharpe, Fagan, Minnich & McKee, LLP

(57) ABSTRACT

A retractable roof for vehicles having at least one cover panel, selectively closing a roof opening. The cover panel can be displaced above the roof skin along guides which have extensions that extend beyond the rear edge of the roof opening. These extensions extend essentially below the roof skin of the fixed roof area.

21 Claims, 4 Drawing Sheets

U.S. PATENT DOCUMENTS

| | | | | |
|---|---|---|---|---|
| 2,497,419 | A | | 2/1950 | Schwartz |
| 2,516,702 | A | | 7/1950 | Kagan |
| 2,853,340 | A | | 9/1958 | Hershberger |
| 3,845,591 | A | | 11/1974 | Stine |
| 3,906,669 | A | | 9/1975 | Vorguitch |
| 4,068,699 | A | | 1/1978 | Tucker |
| 4,286,821 | A | | 9/1981 | Cooper |
| 4,403,805 | A | | 9/1983 | Strem, Jr. et al. |
| 4,463,983 | A | * | 8/1984 | Hellriegel .................. 296/213 |
| 4,537,442 | A | | 8/1985 | Jardin |
| 4,601,512 | A | | 7/1986 | Boots |
| 4,609,222 | A | | 9/1986 | Boots |
| 4,643,478 | A | | 2/1987 | Boots |
| 4,647,105 | A | | 3/1987 | Pollard |
| 4,699,421 | A | | 10/1987 | Schaetzler et al. |
| 4,741,572 | A | | 5/1988 | Bauhof |
| 4,852,938 | A | | 8/1989 | Hirshberg et al. |
| 4,893,868 | A | | 1/1990 | Miller et al. |
| 4,936,623 | A | | 6/1990 | Huyer |
| 4,982,995 | A | | 1/1991 | Takahashi |
| 5,026,113 | A | | 6/1991 | DiCarlo et al. |
| 5,100,197 | A | | 3/1992 | Ichinose et al. |
| 5,197,779 | A | | 3/1993 | Mizuno et al. |
| 5,287,655 | A | | 2/1994 | Harvey |
| 5,335,961 | A | | 8/1994 | Reinsch et al. |
| 5,362,122 | A | | 11/1994 | Reihl et al. |
| 5,421,635 | A | | 6/1995 | Reinsch et al. |
| 5,447,355 | A | | 9/1995 | Kelm |
| 5,484,185 | A | | 1/1996 | Salz et al. |
| 5,603,372 | A | | 2/1997 | Farmont et al. |
| 5,632,523 | A | | 5/1997 | Kelm |
| 5,671,969 | A | | 9/1997 | Sutor et al. |
| 5,746,475 | A | | 5/1998 | Caye et al. |
| 5,765,908 | A | | 6/1998 | Kelm |
| 5,816,647 | A | | 10/1998 | Farmont |
| 6,129,413 | A | | 10/2000 | Klein |
| 6,158,803 | A | | 12/2000 | Reihl et al. |
| 6,443,520 | B1 | | 9/2002 | Schmaelzle et al. |

FOREIGN PATENT DOCUMENTS

| | | |
|---|---|---|
| DE | 34 42 631 | 5/1986 |
| DE | 35 06 460 | 8/1986 |
| DE | 35 36 184 | 11/1986 |
| DE | 37 07 644 | 9/1987 |
| DE | 37 15 268 | 1/1988 |
| DE | 38 01 881 | 8/1988 |
| DE | 38 02 379 | 8/1988 |
| DE | 39 19 385 | 7/1990 |
| DE | 39 03 035 | 8/1990 |
| DE | 39 20 909 | 1/1991 |
| DE | 39 30 756 | 3/1991 |
| DE | 40 31 750 | 4/1991 |
| DE | 41 27 624 | 9/1992 |
| DE | 41 23 229 | 1/1993 |
| DE | 42 01 403 | 2/1993 |
| DE | 93 02 762.1 | 5/1993 |
| DE | 42 38 944 | 10/1993 |
| DE | 93 06 187.0 | 1/1994 |
| DE | 42 27 400 | 2/1994 |
| DE | 44 05 583 | 9/1994 |
| DE | 43 29 583 | 10/1994 |
| DE | 43 29 580 | 11/1994 |
| DE | 44 04 618 | 3/1995 |
| DE | 44 07 286 | 5/1995 |
| DE | 44 15 649 | 6/1995 |
| DE | 195 03 786 | 8/1996 |
| DE | 196 08 916 | 4/1997 |
| EP | 0 309 775 | 4/1989 |
| EP | 0 353 695 | 2/1990 |
| EP | 0 403 388 | 12/1990 |
| EP | 0 480 166 | 4/1992 |
| EP | 0 608 869 | 8/1994 |
| EP | 0 556 420 | 10/1995 |
| FR | 2 591 953 | 6/1987 |
| GB | 349172 | 5/1931 |
| GB | 573355 | 11/1945 |
| GB | 2 258 848 | 2/1993 |
| IT | 551 257 | 11/1956 |
| JP | 1-54208 | 3/1989 |
| JP | 4-90924 | 3/1992 |
| NL | 8 802 552 | 10/1988 |
| WO | WO 94/25301 | 11/1994 |

* cited by examiner

F
11
14
12
10
1
T
16
16
2
12C
12B
3
16A
16A
14
24, 18
18, 24
14

11
14
18,24
20A
20B
3
1
16
20B
10
12
28B
2
16
28
28A
11
28C
22
14

14
11
10
20B
21B
28
16
30
16A
24B
24A
26
18
22
1
14
3
2

RETRACTABLE ROOF FOR VEHICLES

This patent application is a continuation, of application Ser. No. 09/982,248 filed on Oct. 17, 2001, now abandoned, which is a continuation of Ser. No. 09/581,975 filed on Jun. 20, 2000 now abandoned, which is a 371 of PCT/EP99/08843, filed Nov. 17, 1999, and incorporated herein by reference.

The invention relates to a retractable roof for vehicles and more particularly to a retractable roof for a vehicle having a roof opening wherein a fixed roof section is positioned therein to defining the rear edge of the roof opening and forming a roof skin and wherein at least one cover panel is movable to selectively close the roof opening and/or at least partially expose the roof opening, and wherein guide rails, which are fixedly attached to the vehicle, guide at least one of the cover panels when the cover is moved, and wherein a delimiter, which is fastened to the vehicle or attachable to the vehicle, delimits the retractable roof at at least two opposite edges and which forms or carries the guide rails, and wherein at least one cover panel can be displaced along the guide rails, and starting from a closed position can be moved into an open position located above the fixed roof section, and whereby the guide rails have extensions which, in the direction of displacement of at least one cover panel, extend beyond the rear edge of the roof opening which rear edge delimits the fixed roof area.

BACKGROUND OF THE INVENTION

Retractable roofs are known from the state of the art of DE 39 20 909 A1 on which the present invention is based. In the case of this retractable roof, a cover panel, which is always located above the roof skin can be displaced along lateral guide rails into the opened or closed position. All of the guide rails are thus arranged above the roof skin so that when the retractable roof is closed, the guide rails and the one-piece sliding cover renaming above the roof skin and represent a disruptive element on the surface of the vehicle roof. In order to achieve an extensively complete exposure of the roof opening, disadvantages in the form of drag on the vehicle as well as aesthetic factors must be accepted.

In view of prior retractable roof designs, there is a need for a retractable roof which, in the opened position, permits as complete an exposure of the roof opening as possible, but whose adjustment elements, when the retractable roof is in the closed position, are essentially non-disruptive, and preferably the adjustment elements be simply constructed and/or ensure a very stable attachment of the mounted cover panel.

SUMMARY OF THE INVENTION

In accordance with the invention, the above-mentioned technical problems are solved by means of a retractable roof for vehicles set forth in the present invention. In particular, there is provided a retractable roof for vehicles. The vehicle includes a roof opening with a fixed roof section positioned therein. The fixed roof section is connected to the rear edge of the roof opening and forms a roof skin over a portion of the roof opening. At least one cover panel is provided which can be selectively moved to close the roof opening, or at least partially expose an opening in the roof opening. Guide rails are provided which are fixedly attached to the vehicle. The guide rails guide the movement of one or more cover panels in the roof opening. A delimiter is also provided which is fastened to the vehicle or is attachable to the vehicle, and which delimits the retractable roof at at least two opposite edges in the roof opening. The delimiter is designed such that the guide rails are formed in the delimiter and/or are attachable to the delimiter. At least one cover panel is designed to be displaced along the guide rails. The cover panel, starting from a closed position, is movable into an open position which is located above the fixed roof area. The guide rails include extensions which, in the direction of displacement of at least one of the cover panels, extend beyond the rear edge of the roof opening, which rear edge delimits the fixed roof area. The extensions are designed to extend below the roof skin of the fixed roof area. The roof skin has, in the area of the extensions of the guide rails, recesses, respectively exposing one opening, as an extension of the lateral roof opening edges. Cover panel-supporting elements are provided for guiding at least one cover panel along the guide rails. The panel-supporting elements are fixedly connected to at least one cover panel. When at least one cover panel is in the completely open position, at least rear cover panel-supporting elements are provided to enrage with the extensions of the guide rails below the roof skin and to extend at least in the completely open position through the assigned opening.

In accordance with the invention, it has been recognized that the guide rails for guiding the support elements of the cover panel can also be extended beyond the area of the roof opening below the roof skin if appropriate openings in the roof skin for the passage of cover panel support elements are provided. As a result, the support elements of the cover panel can be guided below the roof skin, and yet are arranged in a mechanically very effective manner, i.e. relatively far behind at the associated cover panel.

Thus, among other things, the following, advantages are achieved: the retractable cover panel may essentially be slid completely out of the roof opening, so, that the roof opening can be completely exposed. Also, it is possible to respectively arrange two cover panel-supporting elements at each longitudinal side of the cover panel portion, which, are respectively arranged in the vicinity of the front and rear edge of the cover panel. Thus, it is possible to secure the cover panel in a very stable manner in the opened position, particularly in the completely opened position. The stability of the cover, is thus ensured, even during fast driving speeds of the vehicle since the cover panel is held at a total of four places spaced relatively far apart. Moreover, there is the additional advantage that the guide rails are not arranged outside the roof skin, so that the aesthetic appearance of the retractable roof is improved. By means of cover panel-supporting elements that are adjustable in height, it is also possible to align at least the one cover panel, while in its closed position, with the vehicle roof.

Basically, it is also possible to provide several cover panels which, preferably halfway, respectively, lock the roof opening in the closed position and both of which are arranged in the open position above the fixed roof area. Accordingly, both cover panels at least partially will overlap.

In the case of a preferred alternative, two cover panels are provided. The first cover panel is arranged in the open position above the fixed roof area. The second cover panel can be guided along guide rails attached to the vehicle and, starting from the closed position, lowered into a position beneath the roof area and along guide rails attached to the vehicle, moved into the lowered state below the fixed roof area. In this way,.the second cover panel, in the open position, is at, least partially arranged below the fixed roof area and forms a conventional retractable roof while the first cover panel in the open position is arranged above the fixed roof area. This combination, where one part of the cover panel is displaced above and one part below the roof skin—even without the openings for the rear cover panel-supporting elements—is of independent innovative significance.

By means of the two last-mentioned alternatives which have at least two cover panels for the complete closing of the roof opening, it is advantageously achieved that the roof opening in the vehicle roof may occupy more than 50% of the available surface area of the vehicle roof. Furthermore, since in the open position both cover panels can be slid in a preferred way completely out of the roof opening, a retractable roof is created which opens up a large portion of the vehicle roof.

Basically, the invention concerns a roof structure for a vehicle with a retractable roof where the fixed roof area and possibly also the opening for cover panel-supporting elements is/are a portion of the roof structure of the vehicle assembly.

Also, in an additionally preferred way, the fixed roof area itself, which is essentially mounted by means of the extensions of the guide rails, is constructed in the form of a separate cover panel. Preferably, its outer surface is essentially aligned with the remaining roof skin of the vehicle roof. Due to the construction as a separate cover panel, advantages with respect to manufacture and mounting result since the openings arranged above the extensions of the guide rails can be formed in accordance with the corresponding size and shape of the separate cover panel. The cut-out area in the vehicle roof is then correspondingly large and the retractable roof may then be fitted to the opening. Moreover, there is the advantage that the separate cover panel, as well as at least the one movable cover panel, may be constructed in a special way, for example as a translucent or transparent sunroof cover.

In summary, the invention pertaining to a retractable roof for vehicles. The vehicle includes a roof opening with a fixed roof section positioned therein. The fixed roof section is connected to the rear edge of the roof opening and forms a roof skin over a portion of the roof opening. At least one cover panel is provided which can be selectively moved to close the roof opening, or at least partially expose an opening in the roof opening. Guide rails are provided which are fixedly attached to the vehicle. The guide rails guide the movement of one or more cover panels in the roof opening. A delimiter is also provided which is fastened to the vehicle or attachable to the vehicle, and which delimits the retractable roof at at least two opposite edges in the roof opening. The delimiter is designed such that the guide rails are formed in the delimiter and/or attachable to the delimiter. At least one cover panel is designed to be displaced alone the guide rails. The cover panel, starting from a closed position, is movable into an open position which is located above the fixed roof area. The guide rails include extensions which in the direction of displacement of at least one of the cover panels, extend beyond the rear edge of the roof opening, which rear edge delimits the fixed roof area. The extensions are designed to extend below the roof skin of the fixed roof area. The roof skin has, in the area of the extensions of the guide rails, recesses, respectively exposing one opening, as an extension of the lateral roof opening edges. Cover panel-supporting elements are provided for guiding at least one cover panel alone the guide rails. The panel-supporting elements are fixedly connected to at least one cover panel. When at least one cover panel is in the completely open position, at least rear cover panel-supporting elements are provided to engage with the extensions of the guide rails below the roof skin and to extend at least in the completely open position through the assigned opening.

In one preferable embodiment, at least one cover panel is displaced vertically by means of the cover panel-supporting elements.

In another preferable embodiment,a second cover panel is provided which, starting from the closed position, can be lowered into a lowered position located below the fixed roof area and can be moved along guide rails, fixedly connected to the vehicle. Preferably, the second cover panel can be moved alone the guide rails while in the lowered state below the fixed roof area.

In still another preferable embodiment, the fixed roof area is in the form of an independent cover panel.

In yet another preferable embodiment, the attachment elements are provided for mounting the fixed roof area alone the extensions of the guide rails and/or at the delimiter.

In still yet another preferable embodiment, the attachment elements are channel-like and extend essentially across the length of the fixed roof area.

In a further preferable embodiment, at least one sealing step is provided for closing off each opening.

In yet a further preferable embodiment, the guide rails and their extensions have water channels which extend essentially across the entire length of the cover panels and of the fixed roof area.

The above-mentioned components as well as the claimed components which are described in the embodiment examples and are to be used in accordance with the invention are not subject to particular exceptions with respect to size, form, material selection and technical conception, so that the selection criteria known in that area of application can find unlimited application. Additional details, characteristics and advantages of the object of the invention can be gathered from the subsequent description of the attached drawing, in which, for example, a preferred embodiment example of the retractable roof of the invention is shown.

BRIEF DESCRIPTION OF THE DRAWINGS

Reference may now be had to the drawings, which illustrate various embodiments that the invention may take in physical form and in certain parts and arrangement of parts wherein.

DETAILED DESCRIPTION OF THE INVENTION

Figure 1:
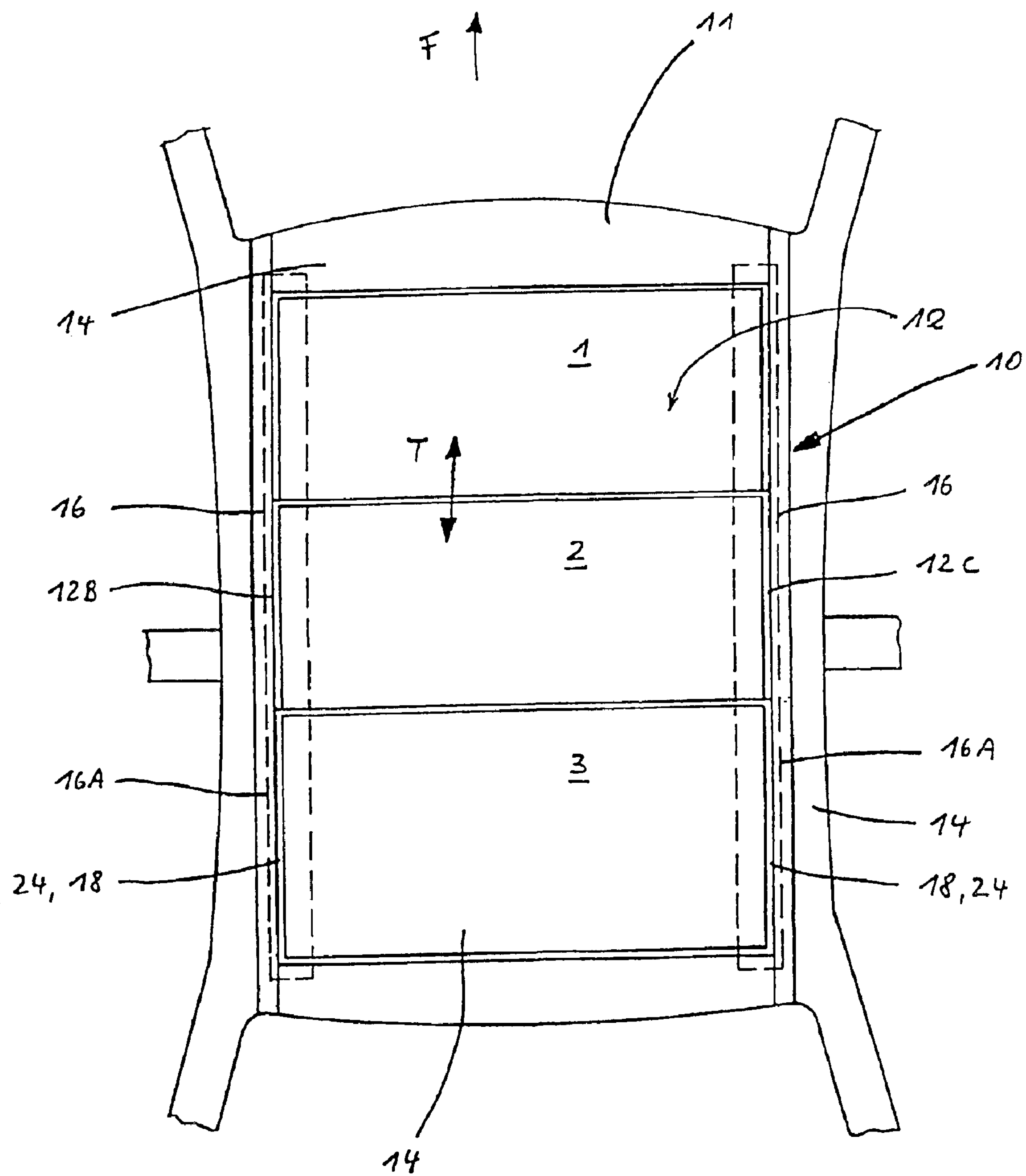
FIG. 1 shows a retractable roof built into a vehicle, with two cover panels in the closed position as viewed from above.
Figure 2:
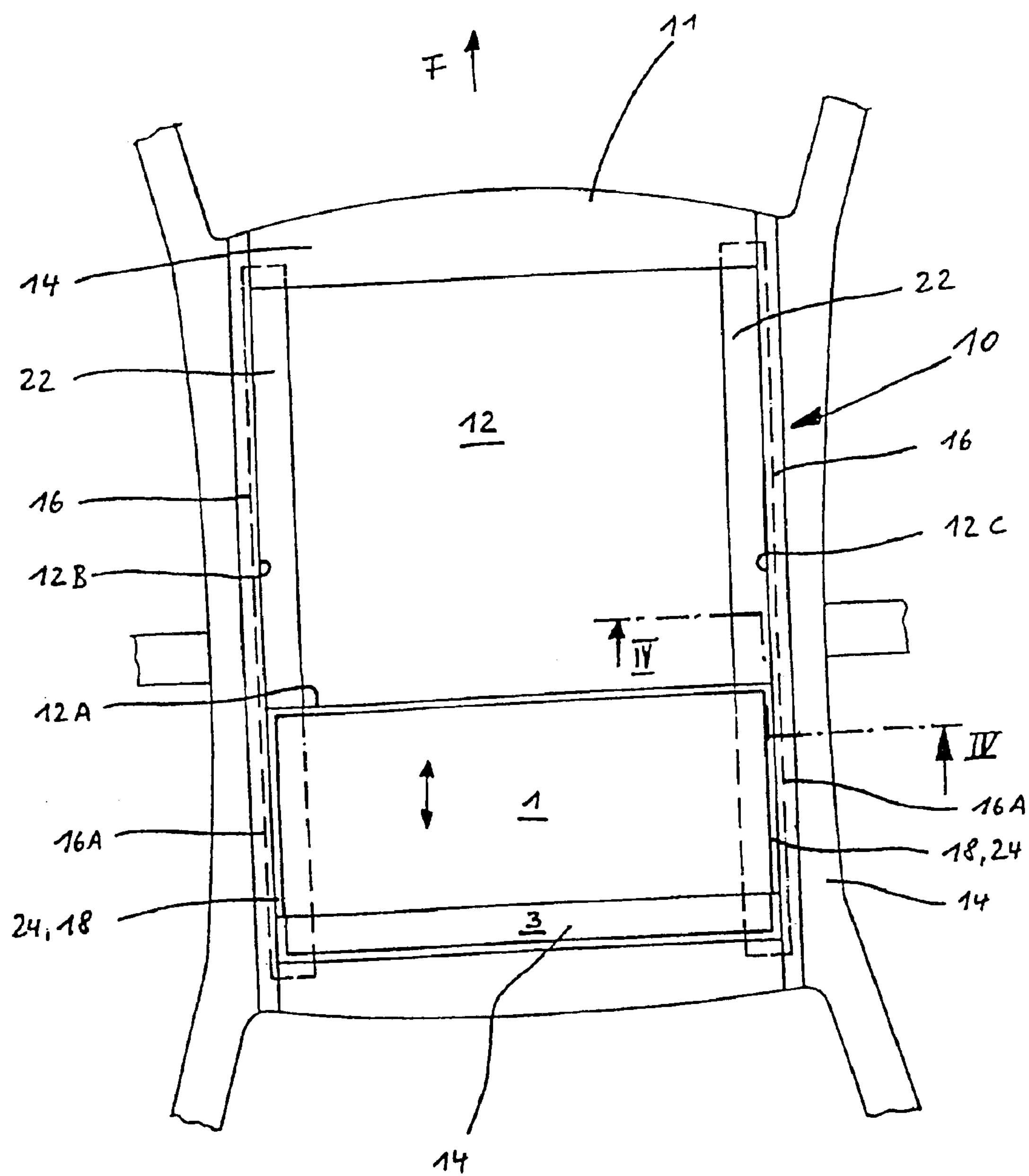
FIG. 2 shows the retractable roof shown in FIG. 1 in the opened position as viewed from above.
Figure 3:
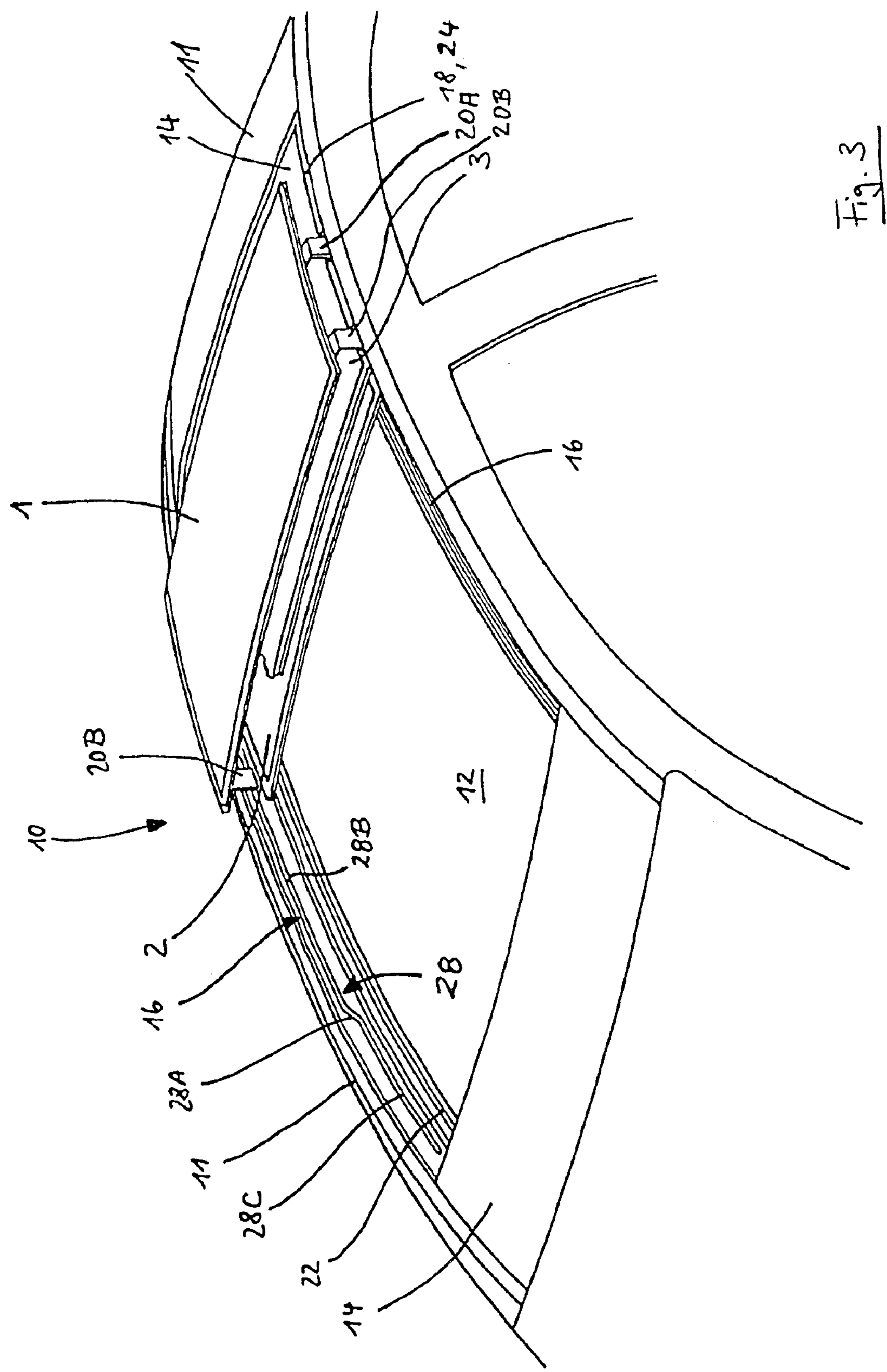
FIG. 3 shows the same retractable roof in the opened position in a perspective representation.
Figure 4:
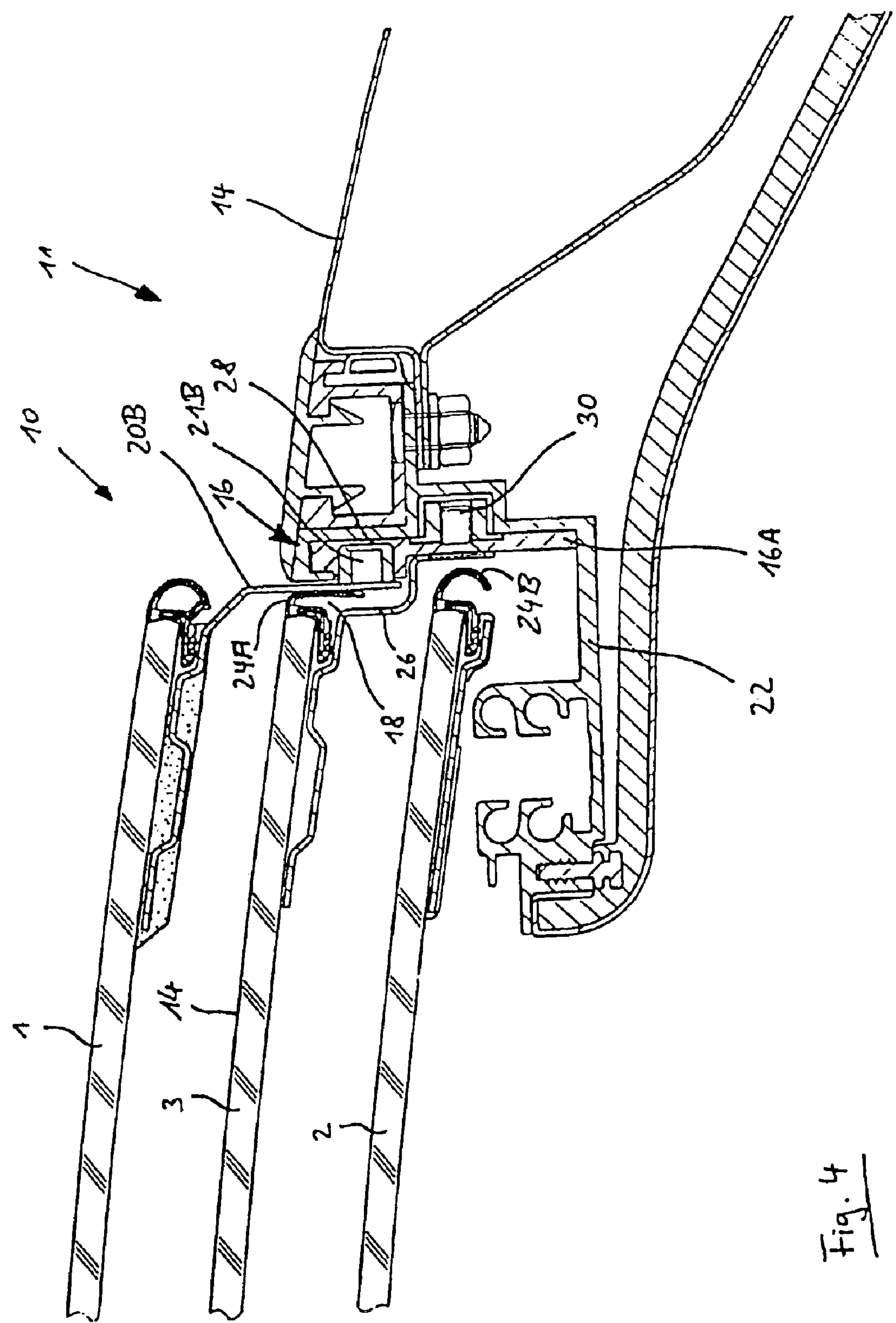
FIG. 4 shows the same retractable roof in the opened position in vertical cross section alone ling IV—IV in FIG. 2.

Referring now to the drawings wherein the showings are for the purpose of illustrating preferred embodiments of the invention only and not for the purpose of limiting the same, reference is first had to FIGS. 1 to 4 wherein a retractable roof 10 of the invention for a vehicle with a vehicle roof 11 having a roof opening 12 is shown. Furthermore, the retractable roof 10 has a first cover panel 1 and a second cover panel 2, which cover panels selectively block the roof opening 12 or at least partially expose it. Furthermore, cover panel-supporting elements 20 are provided (FIGS. 3 and 4)

which are tightly connected with the first cover panel 1. Also, cover panel supporting elements are provided which are connected with the second cover panel 2; however, these cover panel-supporting elements are not shown in the drawing for the sake of clarity since the development of said cover panel-supporting elements is known in itself and is not essential to the invention.

At the two lateral edges 12B and 12C of the roof opening 12, guide rails 16 are provided in which at least the cover panel-supporting elements 20 are guided. The guide rails 16 each have one guide respectively, bar bracket 28, into which respectively one guide pin 21, 21A, 21B grips which is connected with the cover panel-supporting element 20, 20A, 20B. The path of the guide bar bracket 28 and the shape of the guide pin 21 are shown in detail in the FIGS. 3 and 4.

The cover panel 1, in the closed position of the retractable roof as shown in FIG. 1, is arranged essentially in the surface provided by the roof skin 14. In an open position of the retractable roof 10, however, the cover panel 1 is arranged at least partially above a fixed roof area 3 with a predetermined distance above the roof skin 14. This can be 5 seen in FIGS. 3 and 4.

The guide rails 16 have extensions 16A which extend in the direction T of displacement of the cover panel 1 beyond the rear edge 12A of the roof opening 12 against which the fixed roof area 3 abuts. The guide rails 16, together with their extensions, are located essentially below the roof skin 14. The fixed roof area 3 is mounted essentially by the two extensions 16A.

In the area of the extensions 16A of each guide rail 16, an aperture 18 is provided in the roof skin 14; the guide rails are an extension of the lateral edges 12B, 12C of the roof opening.

Finally, provisions are made wherein at least the rear cover panel-supporting elements 20A engage, at least in the completely open position of the retractable roof, the extensions 16A of the guide rails 16 below the roof skin 14 and extend through the assigned opening 18, thereby keeping the cover panel 1 positioned above the roof area 3. For this purpose, at each longitudinal side of the cover panel 1, rear and front cover panel-supporting elements 20A and 20B are provided which carry the cover panel 1 at a distance to each other.

During the opening and closing of the retractable roof, the following predetermined sequence results due to the shape of the guide bar brackets 28 of the guide rails 16, including the extensions 16A: starting with the closed position shown in FIG. 1, the guide pin 2fA of the cover panel-supporting element 20A, which is in the rear as viewed in the direction of displacement T, extend at each longitudinal side of the first cover panel 1 at first along a section 28A of the guide bar bracket 28 which extends to the rear, diagonally toward the top. Thus, rearward during the displacement of the first cover panel, the guide pin 21A of the cover panel-supporting element 20A is set in upward direction, so that the rear portion of the first cover panel 1 is lifted upwardly out of the plane of the roof skin 14. During further displacement of the first cover panel 1 rearwardly, the guide pin 21A of the rear cover panel-supporting element 20A extends alone the essentially horizontally extending rear guide bar bracket section 28B. If during further rearward displacement of the first cover panel 1 the front guide pin 21B of the front cover panel-supporting element 20B is also moved toward section 28A, where the guide pin extends along a front section 28C of the guide bar bracket 28, then the front part of the first cover panel 1 is also lifted. In this way, the completely lifted first cover panel 1 is essentially parallel to and spaced at a predetermined distance from the surface determined by the roof skin 14 of the fixed roof area 3. When the first cover panel 1 is finally adjusted completely in rearward direction, then it is located completely above the fixed roof area 3, as shown in FIGS. 2 to 4. In this way, the first cover panel 1 completely exposes the surface of the roof opening 12 it covers when the retractable roof is closed. At that time, due to the special shape of the cover panel-supporting elements 20 as well as of the guide rails 16, including the extensions 16A and the slots 18, it is assured that merely a portion of the cover panel-supporting elements 20 protrudes upwardly from the surface which is predetermined by the roof skin 14. The actual guidance, however, takes place underneath the roof skin 14.

In the example shown in the drawing, a second cover panel 2 is provided which, during its rearward displacement, is also guided along the guide rail 16, which is rigidly connected to the vehicle and the extension 16A and is placed into a position below the fixed roof area 3. If also the second cover panel 2 has been displaced completely into its opened position, it then also reveals the surface of the roof opening 12 which is taken up by it in the closed position. This is shown in the FIGS. 2 to 4, wherein in FIG. 3 the fixed roof area 3 is shown as broken away toward the left in order to illustrate more dearly the arrangement of the second cover panel 2 below the roof area 3.

The openings 18 for the guide rail 16, 16A, which are formed at the lateral edges of the fixed roof area 3, may be fundamentally formed by corresponding recesses in the vehicle roof 11. However, this embodiment, which is not shown in the drawing, makes great demands on the manufacture of the vehicle roof, so that the shape of the fixed roof area 3, described below, is preferred.

As shown in the FIGS. 1 to 4, the fixed roof area 3 is preferably in the form of an independent cover panel which is subsequently tightly connected to the vehicle roof 11, wherein the roof skin 14 is essentially aligned with the remaining vehicle roof. In order to secure the roof area 3, which is in the form of a cover panel, to the vehicle roof 11, attachment elements 26 are provided wherein in the present example the attachment elements 26 are not fastened directly at the vehicle roof 11, but at each of the extensions 16A of the guide rails 16. However, since the guide rails 16 are connected without play to the vehicle roof 11, also the roof area 3 is thus tightly connected to the vehicle roof 11, as is shown in FIG. 4.

The attachment elements 26 have the special form shown in FIG. 4, which results from the position of the guide bar bracket 28 in the extension 16A of the guide rail 16. The thin cover panel-supporting elements 20A, 20B, which support the first cover panel 1 in the opened position of the retractable roof 10 above the fixed roof area 3, must be movable along the guide bar bracket 28 without meeting any obstacles by means of the attachment elements 26 with the assigned guide pin 21A or 21B. For this reason, the attachment element 26 has a multiply-offset shape, which, on the one hand, permits an attachment at the extension 16A with the aid of screws 30 below the position of the guide bar bracket 28 and, on the other hand, by means of the attachment element 26, an area below the opening 18 is exposed and the attachment element 26 finally comes to rest against the roof area 3. In this way, the separate cover panel (fixed roof area 3) is tightly connected to the extension 16A, at which point the cover panel-supporting elements 20A and 20B can simultaneously be moved back and forth along the guide bar bracket 28 in an unhindered manner.

The attachment element 26 may be tongue-like so that, similar to the situation of the cover panel-supporting elements 20A and 20B, a total of several attachment elements for fastening the fixed roof area 3 finds application. However, as shown and preferred thus far, the attachment element 26 may also be strip-like, so that the attachment element 26 is connected without play to the roof area (3) essentially across the entire length or across a portion of the length of the separate cover panel, i.e., of the fixed roof area 3. The result is that the attachment element 26 functions below the opening 18 also as a water channel.

As already described, when the retractable roof 10 is in the opened position, the second cover panel 2 is located under the fixed roof area 3. For this purpose, the aforementioned cover panel-supporting elements are necessary, which in a conventional way are guided along the guide rail 16 and its extension 16A and have means for lowering and lifting the cover panel 2 or are connected therewith. Since, thus far, a conventional embodiment of a retractable roof is involved, the second cover panel 2 is shown in FIG. 4 without the respective cover panel-supporting elements.

Furthermore, the drive mechanism for adjusting the cover panels 1 and 2 is not shown in the drawing since the type of the drive and possible coupling means are not essential to the essence of the present invention. For this reason, each fundamentally suitable form of a retractable roof drive mechanism can find application. In the same way, it is purely a matter of choice whether the cover panel 2, which can be lowered during the opening process, is arranged in front of or behind the cover panel 1, which can be lifted during opening, and is arranged in the closed state or which of the two cover panels is moved first and which one second.

Furthermore, the (first) cover panel 1 assumes the function of a wind deflector in the shown embodiment when it pivots upwardly at its rear edge at the beginning of the opening movement. Moreover, it is possible, following the initial pivoting process of the first cover panel, to at first slide the second cover panel rearwardly. In this way, the wind deflector function is maintained until the front cover panel-supporting elements 20B of the front cover panel 1 are lifted through the diagonal guide bar bracket section 28A during rearward displacement.

As shown in particular in FIG. 4, at least one flexible sealing strip 24A, respectively, for the closing of each opening 18 is provided, wherein the sealing strip 24A is attached at the lateral edge of the fixed roof area 3.

During the opening and closing of the retractable roof 10, the seal 24 is pushed toward the side by the cover panel-supporting elements in order to locally expose the opening 28. Similarly, the opening seal of the (second) cover panel 2 is in the closed state: the sealing strip 24B used makes it possible for the (first) cover panel 1, during displacement toward the rear, to move across the cover panel 2 in the same way across the cover panel 3.

As shown in particular in the FIGS. 3 and 4, the guide rails 16 and their extensions 16A are constructed in such a way that they have water channels 22 which extend essentially across the entire length of the cover panels 1 and 2 as well as of the roof area 3. In this way, water entering through the lateral openings of all cover panels 1 to 3 can be collected and guided away. In the present embodiment example, the separate profiles of the water channels 22 serve as a basic part of the entire retractable roof 10 with which its attachment at the vehicle roof 11 takes place. The basic part may also be in the form of a surrounding frame and, if desired may be constructed to be fitted in place.

The invention has been described with reference to a preferred embodiment and alternatives thereof. It is believed that many modifications and alterations to the embodiments discussed herein will readily suggest themselves to those skilled in the art upon reading and understanding the detailed description of the invention. It is intended to include all such modifications and alterations in so far as they come within the scope of the present invention.

What is claimed is:

1. A retractable roof for vehicles having a roof skin with an outer contour and a roof opening (12), comprising: a fixed roof area (3) connected to the rear edge (12A) of the roof opening (12) and forming a portion of the roof skin (14), at least one cover panel (1, 2) that is at least movable between a closed position to close the roof opening (12), and an open position to at least partially expose the roof opening (12), the roof opening having side edges (12B, 12C) extending in the driving direction (F), guide rails (16) which are attached to the vehicle at the side edges (12B, 12C) which guide said at least one cover panel (1, 2), and at least one cover panel-supporting element (20) connected to said at least one cover panel (1, 2), said at least one cover panel being positioned at least partially above said fixed roof area (3) when moved to a non-closed position, said guide rails (16) including at least on guide rail extension (16A) extending rearwardly beyond the rear edge (12A) of the roof opening (12) and being entirely below the roof skin contour, the roof skin (14) including at least one recess adjacent said at least one extension (16A) of said guide rails, said at least one recess defining a lateral opening (18) extending in the driving direction (F) of the vehicle which functions as an extension of the side edges (12B, 12C) of the roof opening, said at least one cover panel-supporting element (20) guiding said at least one cover panel (1, 2) along said guide rails (16, 16A), said at least one cover panel-supporting element (20) engaging said at least one extension (16A) of said guide rails (16) below the roof skin contour (14) and extending at least partially through said lateral opening (18) when said at least, one cover panel is moved to a completely open position, wherein said cover panel-supporting elements (20) are fixedly connected to said at least one cover panel (1, 2).

2. The retractable roof according to claim 1, wherein said at least one cover panel is vertically displaced by said at least one cover panel-supporting element when said at least one cover panel-supporting element is moved rearwardly along said guide rails.

3. The retractable roof according to claim 2 wherein said at least one cover panel (1) is a first cover panel and a second cover panel (2), said second panel being movable into a lowered position that is located below said fixed roof area.

4. The retractable roof according to claim 1 wherein said at least one cover panel (1) is a first cover panel and a second cover panel (2), said second panel being movable into a lowered position that is located below said fixed roof area.

5. The retractable roof according to claim 1 wherein said fixed roof area (3) is an independent cover panel.

6. The retractable roof according to claim 2 wherein said fixed roof area (3) is an independent cover panel.

7. The retractable roof according to claim 3 wherein said fixed roof area (3) is an independent cover panel.

8. The retractable roof according to claim 4 wherein said fixed roof area (3) is an independent cover panel.

9. The retractable roof according to claim 1 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

10. The retractable roof according to claim 2 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

11. The retractable roof according to claim 3 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

12. A retractable roof according to claim 4 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

13. The retractable roof according to claim 5 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

14. The retractable roof according to claim 6 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

15. The retractable roof according to claim 7 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

16. The retractable roof according to claim 8 wherein said at least one cover panel supporting element (20) has a central portion which extends through said lateral opening (18) and said central portion is strip like with a thickness and a width, said width extending in the driving direction (F) of the vehicle, said fixed roof area is closely adjacent to the roof skin, the fixed roof area has side edges adjacent said lateral opening, said retractable roof further including a flexible sealing strip attached to both said side edges of said fixed roof area, said sealing strips extending toward and resiliently engaging the respective adjacent side edges of said lateral opening (18) thereby sealing said lateral opening, said sealing strips allowing said at least one cover panel supporting element to extend through said lateral opening as said at least one cover panel is moved to the non-closed position.

17. The retractable roof as defined in claim 1, including at least one sealing strip (24A, 24B) for at least partially closing off said lateral opening (18).

18. The retractable roof as defined in claim 1, wherein said guide rails (16) and said at least one guide rail extension (1 6A) include at least one water channel (22) extending in the driving direction (F) of the vehicle at least partially along the length of said at least one cover panel (1, 2) and of said fixed roof area (3).

19. The retractable roof according to clam 1, wherein said at least one of said fixed roof area (3) and said at least one cover panel (1, 2) includes a translucent or transparent surface portion.

20. The retractable roof according to claim 1, wherein said fixed area (3) is attached to the roof by attachment elements (26) that include a multiple set-off shape.

21. The retractable roof according to claim 1, wherein said fixed roof area (3) is attached to said roof skin by attachment elements (26) that are tongue-like.

* * * * *